United States Patent [19]

Lee et al.

[11] Patent Number: 5,422,557
[45] Date of Patent: Jun. 6, 1995

[54] METHOD AND APPARATUS FOR CONTROLLING THE SPEED OF A SINGLE PHASE INDUCTION MOTOR USING FREQUENCY VARIATION

[75] Inventors: Jin-Won Lee; Dong-Il Kim, both of Seoul, Rep. of Korea

[73] Assignee: Samsung Electronics Co., Ltd., Suwon City, Rep. of Korea

[21] Appl. No.: 136,696

[22] Filed: Oct. 15, 1993

[30] Foreign Application Priority Data

Oct. 22, 1992 [KR] Rep. of Korea ................ 92-19485

[51] Int. Cl.⁶ .............................................. H02P 7/42
[52] U.S. Cl. ..................................... 318/807; 318/779
[58] Field of Search ........ 318/727, 779, 772, 799–812, 318/748, 775; 363/41, 153–155

[56] References Cited

U.S. PATENT DOCUMENTS

| | | | |
|---|---|---|---|
| 4,047,083 | 9/1977 | Plunkett | 318/772 X |
| 4,477,763 | 10/1984 | Asano et al. | 318/811 |
| 4,480,299 | 10/1984 | Muto et al. | 318/811 X |
| 4,617,675 | 10/1986 | Ashikaga et al. | 318/772 X |
| 4,758,938 | 7/1988 | Kanazawa | 363/41 |
| 5,121,043 | 6/1992 | Kerkman et al. | 318/805 |
| 5,170,110 | 12/1992 | Vlasak | 318/775 |
| 5,187,654 | 2/1993 | Felippe | 363/154 |
| 5,218,283 | 6/1993 | Wills et al. | 318/748 |
| 5,278,486 | 1/1994 | Kim | 318/811 |

Primary Examiner—Jonathan Wysocki
Attorney, Agent, or Firm—Burns, Doane, Swecker & Mathis

[57] ABSTRACT

A method for controlling speed of a single phase induction motor using frequency variation, including the steps of generating an operation start signal and a speed command signal according to a user's selection, outputting a digital data for formation of a sinusoidal wave signal of a desired frequency, to converting means at an interval of a predetermined time period set by a timer to thereby generate the sinusoidal wave signal of the frequency desired by the user, generating the sinusoidal wave based on the digital data, comparing the sinusoidal wave with a triangular signal for controlling a speed of a motor, and converting a DC voltage from a power source into an AC voltage of a frequency band desired by the user to thereby operate the motor. An apparatus for controlling the speed of a single phase induction motor is also provided.

4 Claims, 3 Drawing Sheets

METHOD AND APPARATUS FOR CONTROLLING THE SPEED OF A SINGLE PHASE INDUCTION MOTOR USING FREQUENCY VARIATION

BACKGROUND OF THE INVENTION

1. Field of the Invention

The present invention relates to a method for controlling a speed of a single phase induction motor in which the control of the speed is performed by varying a frequency of a control signal.

2. Description of the Prior Art

Generally, rotation speeds of conventional single phase induction motors are determined according to the frequency of a drive voltage which is supplied from a commercial power source. For this reason, the conventional single phase induction motors are designed in such a manner that the rotation speeds thereof are controlled based on a commercial frequency of 60 or 50 HZ.

FIG. 3 is a schematic block diagram of a conventional apparatus for controlling the speed of such a single phase induction motor, FIG. 4A is a timing diagram of an output signal from an encoder in the apparatus in FIG. 3 and a drive signal to the single phase induction motor when the rotation speed of the motor is low, and FIG. 4B is a timing diagram of the output signal from the encoder in the apparatus in FIG. 3 and the drive signal to the single phase induction motor when the rotation speed of the motor is high. Here, the single phase induction motor is designated as the reference numeral 34.

In operation, when the variable speed motor 34 is is operating at a low speed, an interrupt signal is applied to a central processing unit (CPU) 33 at a rising edge of an output signal from an encoder 31 every one cycle of that signal as shown in FIG. 4A. In response to the interrupt signal, the CPU 33 performs an arithmetic operation for a drive signal DS for a time period of about 0.1 msec and then outputs the resultant drive signal DS to a motor driving circuit 32, thereby causing the driving circuit 32 to control the rotation of the motor 34.

In the case where the motor 34 is operating at a high speed, the interrupt signal is applied to the CPU 33 at the rising edge of the output signal from the encoder 31 every two cycles of that signal as shown in FIG. 4B. Similarly, upon receiving the interrupt signal, the CPU 33 performs the arithmetic operation for the drive signal DS for a time period of about 0.1 msec and then outputs the resultant drive signal DS to the motor driving circuit 32. In response to the drive signal DS outputted from the CPU 33, the driving circuit 32 controls the rotation of the motor 34.

In other words, the arithmetic operation of the CPU 33 is skipped over one of the two cycles of the output signal from the encoder 31. This makes the output time of the drive signal DS from the CPU 33 short. The short output time of the drive signal DS results in an increase in a duty ratio of an ON interval of the drive signal DS. As a result, the rotation of the motor 34 and, thus, the speed thereof can be controlled even at a high speed.

As mentioned above, in order to control the speed of the motor 34, a time period of about 0.1 msec is required for the arithmetic operation of the CPU 33 with respect to the drive signal DS, and the interrupt signal is applied to the CPU 33 at the rising edge of the output signal from the encoder 31 every one cycle or two cycles of that signal. For this reason, the CPU 33 must stop the output of the drive signal DS to the driving circuit 32 for the arithmetic operation regarding the drive signal DS. Then, upon completion of the arithmetic operation, the CPU 33 outputs the drive signal as a result of the arithmetic operation to the driving circuit 32.

In this connection, the output time of the drive signal DS from the CPU 33 becomes abnormally short, particularly when the motor 34 is operating at a high speed, because the arithmetic operation of the CPU 33 is skipped over one of the two cycles of the output signal from the encoder 31 and requires a time period of about 0.1 msec. For this reason, it is difficult in practice to control the rotation of the motor 34 at a high speed.

On the other hand, in a conventional drive motor for an electric fan in which the rotation speed is controlled by three steps, low, middle and high, low, middle and high speed induction windings must individually be provided in the drive motor. The low, middle and high speed induction windings are connected respectively to different induction windings through a switch for the control of the rotation speed of the drive motor. In this connection, the conventional electric fan drive motor has a disadvantage in that it is complex in construction since the various windings are provided therein. Also, the speed cannot be varied successively.

SUMMARY OF THE INVENTION

Therefore, the present invention has been made in view of the above problems, and it is an object of the present invention to provide an apparatus for controlling a speed of a single phase induction motor in which the control of the speed is performed by various steps through a single induction winding by varying a frequency of a pulse width modulation (PWM) signal as a control a signal using a microcomputer and an inverter, so that the construction can be simplified and the speed can be varied successively.

In accordance with the present invention, the above and other objects can be accomplished by a provision of an apparatus for controlling a speed of a single phase induction motor, comprising signal input means for outputting an operation start signal and a speed command signal regarding the single phase induction motor according to a user' selection; control means having a ROM table, said ROM table storing digital data corresponding to a sinusoidal wave signal, said control means outputting the digital data stored in said ROM table in response to the speed command signal from said signal input means; digital/analog conversion means for converting the digital data from said control means into an analog signal and outputting the resultant sinusoidal wave signal; triangular wave generation means for generating a triangular wave signal; comparison means for inputting the sinusoidal wave signal from said digital-/analog conversion means and the triangular wave signal from said triangular wave generation means, comparing levels of the inputted signals with each other and outputting a signal to control the speed of the single phase induction motor in accordance with the compared result; and inverter means for converting a DC voltage from a power source into a desired frequency of AC voltage in response to the control signal from said comparison means and outputting the converted AC voltage as a drive voltage to the single phrase induction motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
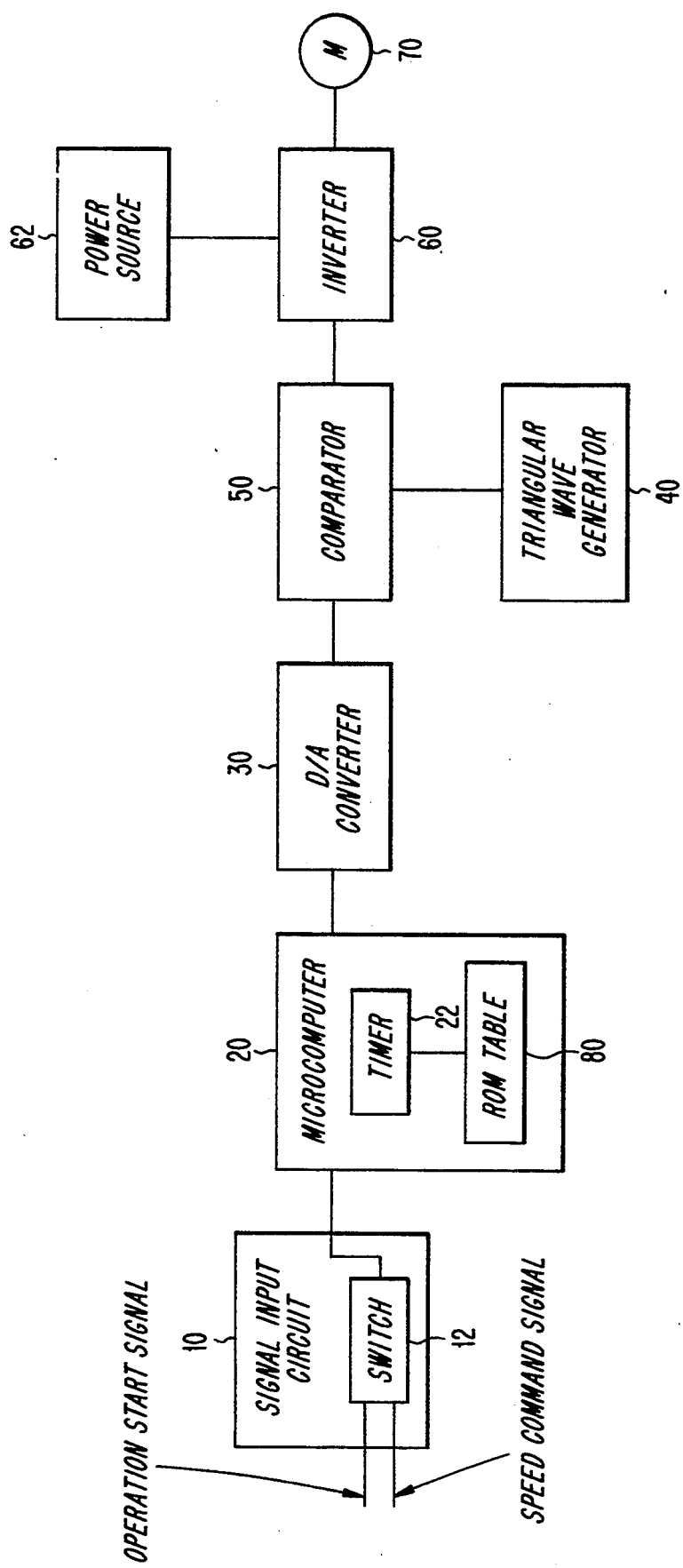
FIG. 1 is a block diagram of an apparatus for controlling the speed of a single phase induction motor in accordance with an embodiment of the present invention.

Referring to FIG. 1, there is shown a block diagram of an apparatus for controlling the speed of a single phase induction motor in accordance with an embodiment of the present invention. Here, the single phase induction motor is designated as the reference numeral 70. As shown in this drawing, the motor speed control apparatus of the present invention comprises a signal input circuit 10 for outputting various signals for the control of the speed of the single phase induction motor 70 according to a user's selection. The signal input circuit 10 outputs an operation start signal and a speed command signal regarding the single phase induction motor 70. A variable resistor (not shown) and a switch 12 are provided in the signal input circuit 10.

Figure 2:
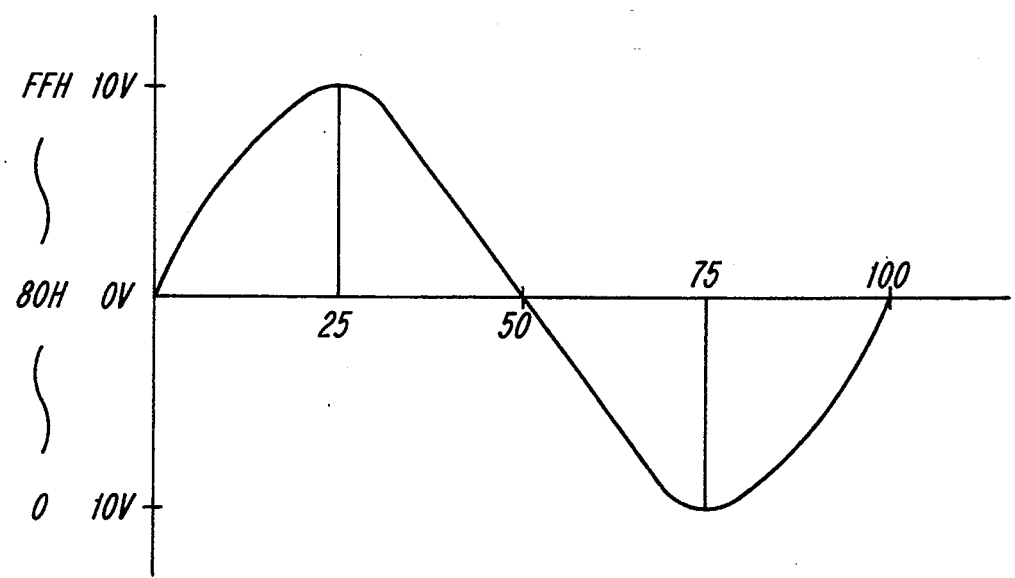
FIG. 2 is a waveform diagram of sinusoidal wave data stored in a ROM table in the apparatus in FIG. 1.
Figure 3:
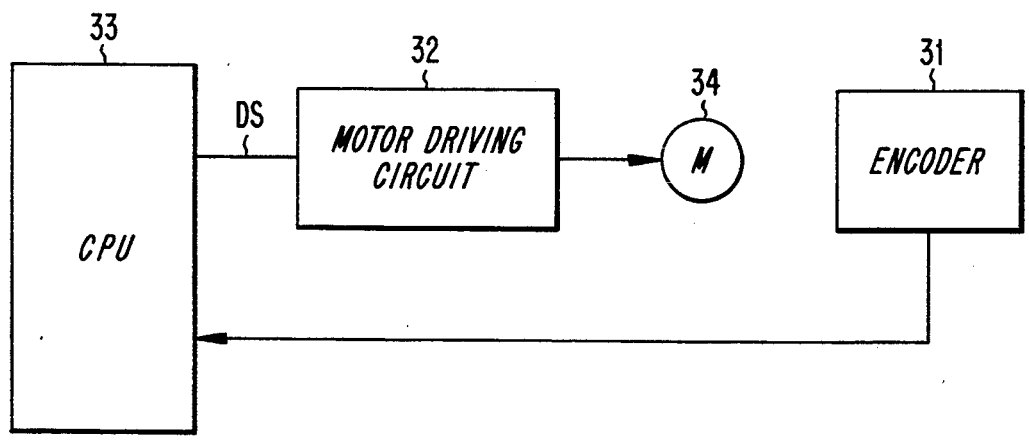
FIG. 3 is a schematic block diagram of a conventional apparatus for controlling the speed of a single phase induction motor.
Figure 4A:
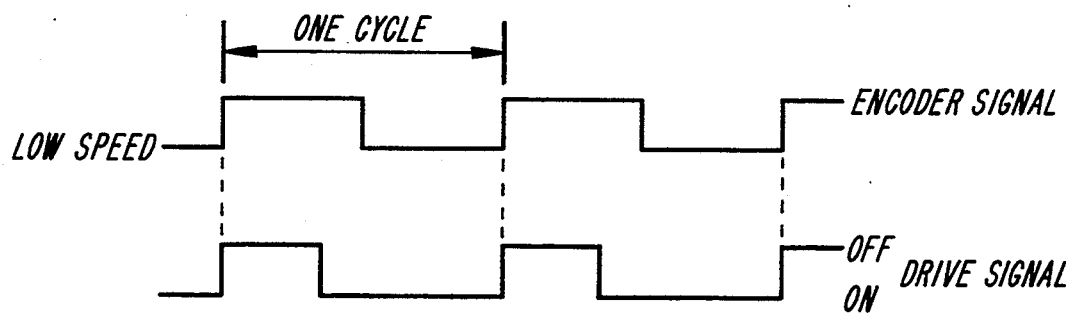
FIG. 4A is a timing diagram of an output signal from an encoder in the apparatus in FIG. 3 and a drive signal to the single phase induction motor when the rotation speed of the motor is low.
Figure 4B:
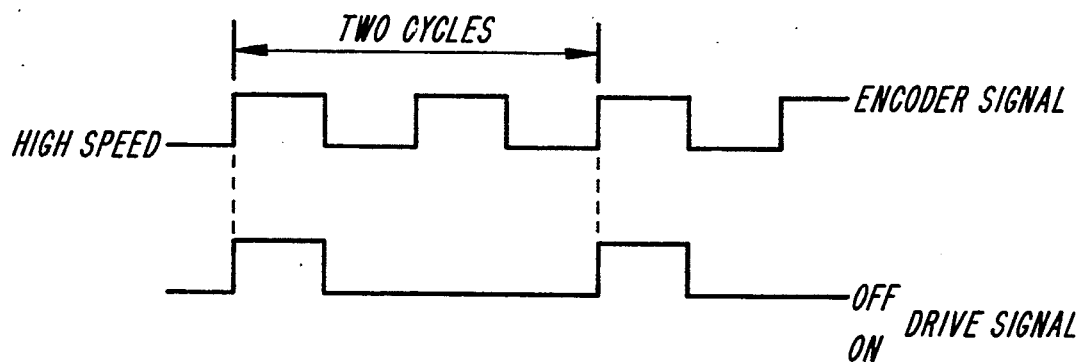
FIG. 4B is a timing diagram of the output signal from the encoder in the apparatus in FIG. 3 and the drive signal to the single phase induction motor when the rotation speed of the motor is high.

A microcomputer 20 is provided in the motor speed control apparatus to output digital data according to a program preset therein in response to the speed command signal from the signal input circuit 10. The digital data from the microcomputer 20 corresponds to a desired frequency of sinusoidal wave signal as shown in FIG. 2.

A read only memory (ROM) table 80 is provided in the microcomputer 20 to store the digital data corresponding to the sinusoidal wave signal. Values of the sinusoidal wave signal are stored in respective locations of the ROM table 80 as shown in FIG. 2. Namely, a value of the sinusoidal wave signal corresponding to 80H is stored in the location of the ROM table 80 corresponding to a 0th address. Sampled values of the sinusoidal wave signal corresponding to 80H-FFH are sequentially stored in the locations of the ROM table 80 corresponding to 1st to 25th addresses. Also, sampled values of the sinusoidal wave signal corresponding to FFH-80H are sequentially stored in the locations of the ROM table 80 corresponding to 26th to 50th addresses. As a result, the data storage is completed with respect to a positive interval of half a period of the sinusoidal wave signal.

Then, sampled values of the sinusoidal wave signal corresponding to 80H-0H are sequentially stored in the locations of the ROM table 80 corresponding to 51th to 75th addresses. Also, sampled values of the sinusoidal wave signal corresponding to 0H-80H are sequentially stored in the locations of the ROM table 80 corresponding to 76th to 99th addresses. As a result, the data storage is completed with respect to a negative interval of half a period of the sinusoidal wave signal.

A timer 22 is also provided in the microcomputer 20 to allow the digital data to be sequentially outputted from the ROM table 80 at an interval of a predetermined time period.

The motor speed control apparatus also comprises a digital/analog (D/A) converter 30 for converting the digital data from the microcomputer 20 into an analog signal and outputting the resultant sinusoidal wave signal and a triangular wave generator 40 for generating a triangular wave signal to be compared with the sinusoidal wave signal from the D/A converter 30 as will hereinafter be described.

A comparator 50 is also provided in the motor speed control apparatus to input the sinusoidal wave signal from the D/A converter 30 and the triangular wave signal from the triangular wave generator 40, compare levels of the inputted signals with each other and output a pulse width modulation (PWM) signal as a control signal for the speed of the single phase induction motor 70 in accordance with the compared result.

An inverter 60 is also provided in the motor speed control apparatus to convert a direct current (DC) voltage from a power source 62 into a desired frequency of alternating current (AC) voltage in response to the control signal from the comparator 50 and output the converted AC voltage as a drive voltage to the single phase induction motor 70.

The operation of the motor speed control apparatus with the above-mentioned construction in accordance with the embodiment of the present invention will hereinafter be described in detail.

First, upon inputting operating data regarding the single phase induction motor 70 from the user, the signal input circuit 10 outputs the operation start signal and the speed command signal regarding the single phase induction motor 70 to the microcomputer 20.

In response to the speed command signal from the signal input circuit 10, the microcomputer 20 outputs the digital data for formation of the sinusoidal wave signal of the desired frequency. In the microcomputer 20, the digital data pre-stored in the locations of the ROM table 80 corresponding to the 0th to 99th addresses are sequentially outputted at an interval of the predetermined time period set by the timer. The sequential digital data from the microcomputer 20 are applied to the D/A converter 30.

For example, if the number of rotations of the single phase induction motor 70 is 1000 rpm at a frequency of 60 HZ, it may be varied within the range of 666 to 1333 rpm by adjusting the frequency within the range of 40 to 80 HZ.

The adjustment of the frequency is made by varying the time interval of the timer, which is connected to the ROM table 80 in the microcomputer 20. Namely, the speed command signal from the signal input circuit 10 indicates the control of the time interval of the timer.

The microcomputer 20 calls sequentially the 0th to 99th address data from the ROM table 80 therein at an interval of the predetermined time period set by the timer. Then, the called data from the ROM table 80 are sequentially outputted to the D/A converter 30, resulting in formation of the sinusoidal wave signal of the desired frequency. The relation between the time interval of the timer and the frequency of the sinusoidal wave signal from the D/A converter 30 can be expressed by the following equation (1):

$$T = 1/(f \times 100) \quad (1)$$

where, T is the time interval of the timer and f is a drive frequency to the single phase induction motor 70, namely, the frequency of the sinusoidal wave signal from the D/A converter 30.

From the above equation (1), it can be seen that the frequency f of the sinusoidal wave signal from the D/A converter 30 is 50 HZ when the time interval T of the timer is, for example, 200 μsec. Also, provided that the time interval T of the timer is 250 μsec, the frequency f of the sinusoidal wave signal from the D/A converter 30 is 40 HZ. That is, the adjustment is made with respect to the drive frequency to the single phase induction motor 70 by varying the time interval of the timer. As a result, the number of rotations of the single phase induction motor 70 can be varied.

It should be noted herein that the time interval of the timer in the microcomputer 20 can be adjusted according to the user's selection so that the sinusoidal wave signal of the frequency desired by the user can be generated on the basis of the adjusted time interval.

The D/A converter 30 acts to convert the digital data from the microcomputer 20 into the analog signal and output the resultant sinusoidal wave signal to the comparator 50, which also receives the triangular wave signal from the triangular wave generator 40. The comparator 80 compares the levels of the inputted signals with each other and outputs the PWM signal as the control signal for the speed of the single phase induction motor 70 in accordance with the compared result. The control signal from the comparator 80 is applied to the inverter 60.

In response to the control signal from the comparator 50, the inverter 60 converts the DC voltage from the power source into the AC voltage of the frequency band desired by the user. The converted AC voltage from the inverter 60 is applied as the drive voltage to the single phase induction motor 70. As a result, the single phase induction motor 70 is driven by the drive voltage from the inverter 60. Therefore, the speed of the single phase induction motor 70 can be controlled as the user desires.

As apparent from the above description, according to the present invention, the speed of the single phase induction motor is controlled by various steps through a single induction winding by varying the frequency of the PWM signal as the control signal using the microcomputer and the inverter. Therefore, the construction can be simplified and the speed can be varied successively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a speed of a single phase induction motor, comprising:
   signal input means for outputting an operation start signal and a speed command signal regarding the single phase induction motor according to a user's selection;
   control means having a ROM table, said ROM table sequentially storing digital data representing sampled values of a sinusoidal wave signal, said control means outputting the digital data stored in said ROM table in response to the speed command signal from said signal input means at an interval of a predetermined time period set by a timer;
   digital/analog conversion means for converting the digital data from said control means into an analog sinusoidal wave signal having a desired frequency in accordance with said interval of said predetermined time period and outputting said sinusoidal wave signal at said desired frequency;
   triangular wave generation means for generating a triangular wave signal;
   comparison means for inputting the sinusoidal wave signal from said digital/analog conversion means and the triangular wave signal from said triangular wave generation means, comparing levels of the inputted signals with each other and outputting a signal to control the speed of the single phase induction motor in accordance with the compared result; and
   inverter means for converting a DC voltage from a power source into a desired frequency of AC voltage in response to the control signal from said comparison means and outputting the converted AC voltage as a drive voltage to the single phase induction motor.

2. An apparatus for controlling speed of a single phase induction motor, comprising:
   signal input means for inputting selected information regarding the single phase induction motor and outputting an operation start signal and a speed command signal in response thereto;
   control means for sequentially storing data representing sampled values of a sinusoidal wave signal and outputting said data in response to the speed command signal from said signal input means at an interval of a predetermined time period set by a timer;
   conversion means for converting said data from said control means into an analog sinusoidal wave signal having a desired frequency in accordance with said interval of said predetermined time period and outputting said converted sinusoidal wave signal at said desired frequency;
   triangular wave generation means for generating a triangular wave signal;
   comparison means for comparing said converted sinusoidal wave signal and said triangular wave signal and outputting a signal to control the speed of the single phase induction motor in accordance with said comparison; and
   inverter means for converting a DC voltage from a power source into a desired frequency of AC voltage in response to said control signal from said comparison means and outputting a drive voltage to the single phase induction motor in accordance with said converted AC voltage.

3. The apparatus according to claim 2, wherein said control means comprises a memory for storing said data in a digital form.

4. A method for controlling speed of a single phase induction motor using frequency variation, comprising the steps of:
   generating an operation start signal and a speed command signal according to a user's selection;

outputting a digital data for formation of a sinusoidal wave signal of a desired frequency to converting means at an interval of a predetermined time period set by a timer to thereby generate the sinusoidal wave signal of the frequency desired by the user;

generating said sinusoidal wave based on said digital data;

comparing said sinusoidal wave with a triangular signal for controlling the speed of a motor; and converting a DC voltage from a power source into an AC voltage of a frequency band desired by the user to thereby operate the motor.

* * * * *